UNITED STATES PATENT OFFICE.

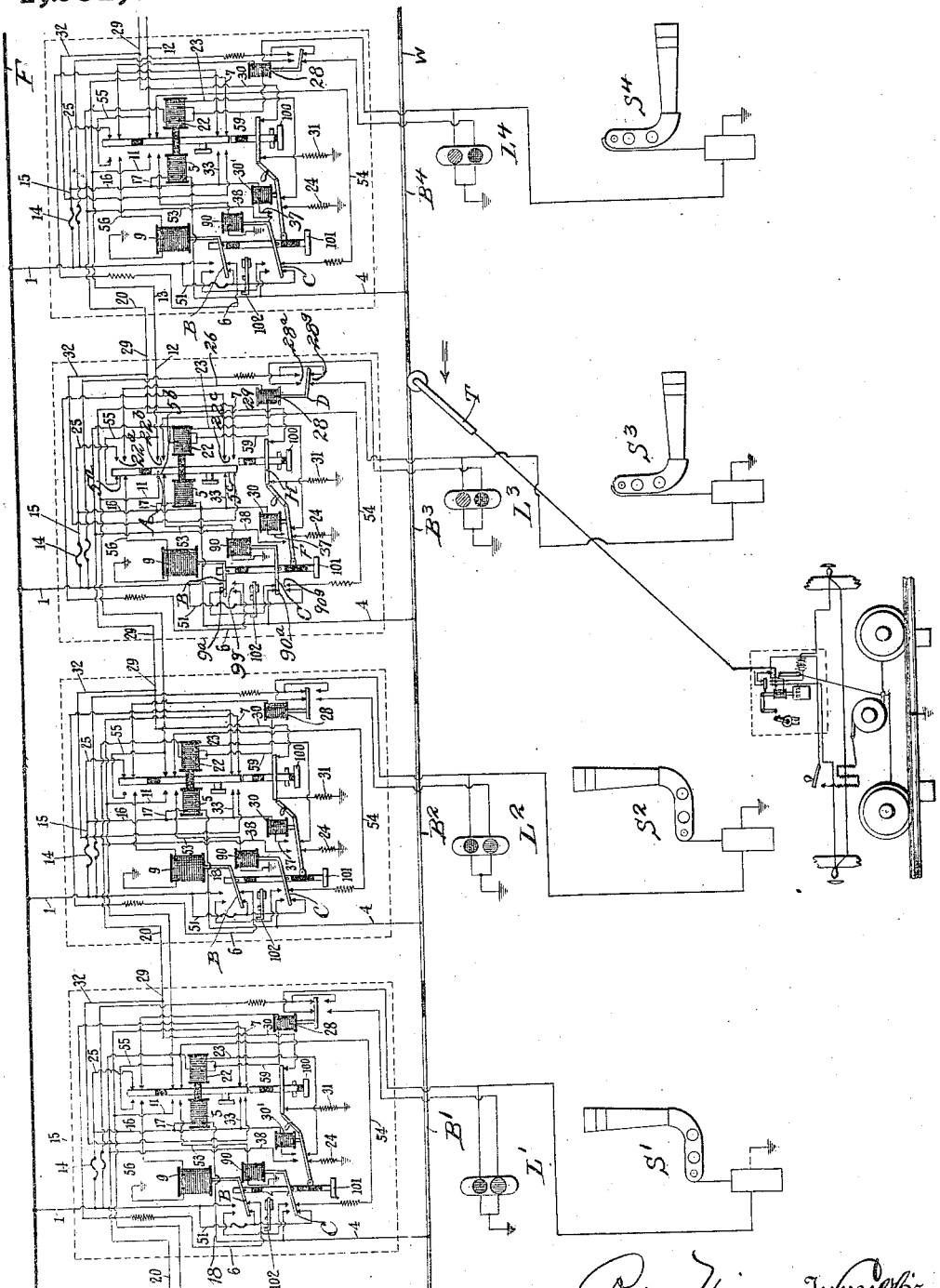

ROY V. COLLINS, OF NEW YORK, N. Y.

SYSTEM FOR SIGNALS AND MOTOR CONTROL FOR ELECTRIC ROADS.

1,261,772.

Specification of Letters Patent.   Patented Apr. 9, 1918.

Application filed May 13, 1913. Serial No. 767,245.

*To all whom it may concern:*

Be it known that I, ROY VINSON COLLINS, of New York, in the county of New York and in the State of New York, have invented a certain new and useful Improvement in Systems for Signals and Motor Control for Electric Roads and do hereby declare that the following is a full, clear, and exact description thereof.

My invention relates to a car control and signal system for railroads, and has for its object to provide a simple, inexpensive system constructed of standard parts easy to maintain and install, and adapted to afford complete protection to a car, both in front and behind, by controlling the power supply, by a positive stop device inclosed from the weather and without protruding parts, and by a signal system which goes to danger by gravity.

A further object is to provide a system which protects the car under all contingencies of operation, including a partial, intermittent, or complete break, ground, or cross in the line wires, in case any derangement or trouble occurs due to lightning; and in case the contactor is out of contact, the wheels of the car off the track, or both these contingencies occur.

A further object is to provide a system adapted to all types of trackage, whether single, double, or turn-out; that prevents the taking of curves or cross-overs at a high rate of speed; that may be used with all kinds and types of signal devices; and that is adapted to and affords complete protection with automatic or with despatcher control.

A further object is to provide an emergency control which allows cars to proceed under protection in case of accident to any part of the system or of any derangement thereof.

It is contemplated that the apparatus will be provided with lightning protectors and other devices adapted to protect and add to its efficiency.

Other and further objects of my invention will be apparent from the following description, and from the accompanying drawing in which similar reference characters refer to similar parts throughout said drawing.

The figure illustrates diagrammatically four blocks or sections with a car entering block $B^3$.

The embodiment chosen to illustrate my invention is shown and described in connection with one track of a double-track trolley railroad using an automatic control and stop, and a signal system consisting of two lights $L^1$, $L^2$, $L^3$, and $L^4$ and a position semaphore $S^1$, $S^2$, $S^3$, and $S^4$. Four blocks, numbered $B^1$, $B^2$, $B^3$, and $B^4$ are illustrated, each block having its trolley wire W insulated by any desired means from the trolley wire of an adjoining block.

Electrical circuits are controlled in this embodiment by contact bars A, B, C, D, E, and H. Contact bars A, B, and C control the car operating circuit, contact bar D controls the signal light and semaphore circuit, and contact bars E and H control in part circuits for emergency operation. These contact bars may be operated by solenoids or by any desired or equivalent means.

In the embodiment illustrated, contact bar A is actuated positively by magnets 5 and 22, contact bar B by magnet 9 and by gravity, contact bar C by magnet 90 and by gravity, contact bar D by magnet 28 and by gravity, contact bar E by magnet 30 and by gravity, and contact bar H by mannual operation and by gravity. Similarly magnet 22 may be a horse shoe or any other type of magnet. Switch points are designated by reference characters corresponding to the magnet which operates the contact bar adapted to close said switch points. Thus when magnet 5 actuates contact bar A switch points $5^a$, $5^b$, and $5^c$ are closed; when magnet 22 actuates contact bar A switch points $22^a$, $22^b$, and $22^c$ are closed; when magnet 9 actuates contact bar B switch point $9^a$ is closed; when magnet 90 actuates contact bar C switch point $90^a$ is closed; when magnet 28 actuates contact bar D switch point $28^a$ is closed; when magnet 30 holds up contact bar E switch point $30^a$ is closed; and when gravity actuates the contact bars B, C, D, or E, switch points $9^g$, $90^g$, $28^g$, and $30^g$ respectively are closed.

Current is supplied to trolley wire W for car operation from feed wire F through switch points $9^a$, which can be closed only when a block behind is dead; and through switch points $90^a$, which can be closed only when a block ahead is dead. Each block normally is dead with contact bar A to the right, contact bars B and C in lower position, and contact bar D in upper position, (blocks $B^1$ and $B^2$). When a car enters a dead block, a circuit first is closed from feed wire F, wire 1, fuse 14, wires 15, 16, 17, magnet 5, wires 18, 4, trolley wire W, trolley T, and through the car to ground. The resistance in this circuit is such that the current is not sufficient to move the car, but is sufficient to cause magnet 5, through which it passes, to pull contact bar A to the left, thereby closing switch points 5$^a$, 5$^b$, and 5$^c$, and opening switch points 22$^a$, 22$^b$, and 22$^c$ (block B$^3$). The closing of these switch points closes circuits which energize three other magnets,—magnet 22 in the block behind (block B$^4$), and magnets 9 and 90 in the same block (block B$^3$). These circuits are as follows: The circuit energizing magnet 22 in the block behind (block B$^4$) is closed (starting from block B$^3$) through wire 1, fuse 14, wires 15, 16, 33, switch points 5$^c$, wires 32, 29, 20, magnet 22, wire 23, switch points 30$^g$, and through resistance 24 to ground. The energizing of magnet 22 (block B$^4$) pulls contact bar A to the right, thereby opening switch points 5$^a$ and 5$^b$, which opens the circuits energizing magnets 9 and 90 respectively in said block. Contact bars B and C thereupon fall by gravity, which opens switch points 9$^a$ and 90$^a$ in the car operating circuit for that block, and deadens this block which the car has just left. While a car is in block B$^3$, it is impossible for a car in block B$^4$ to throw contact bar A in block B$^4$ to the left, as the circuit just described from block B$^3$ to magnet 22 in block B$^4$ has less resistance therein than the circuit in Block B$^4$ to magnet 5 which would be closed by a car in block B$^4$. This condition holds true even though the circuit through the car be broken in any manner as by the trolley T being off its contactor W or the wheels of the car off the track, for the holding circuit of magnet 22 (block B$^4$) is maintained by the position at the left of contact bar A (block B$^3$), and contact bar A can be moved to the right electrically (block B$^3$) to open the holding circuit of magnet 22 (block B$^4$) only by a car entering a block ahead (block B$^2$) of the block containing said contact bar A (block B$^3$). In other words, contact bar A in block B$^4$ cannot be moved to the left as the first step in livening that block until contact bar A in block B$^3$ has been moved to the right, and the only manner in which contact bar A in block B$^3$ can be moved to the right electrically is by the car in that block entering the block ahead (block B$^2$) and performing its electrical function in the block it has just left (block B$^3$). After block B$^4$ thus has been deadened, and not until then, a circuit is closed through magnet 9 in block B$^3$ (starting from block B$^4$) through wires 1, 51, switch points 9$^g$, wire 6, switch points 22$^c$, wires 7, 13, 12, 55, switch points 5$^a$, wire 56, and through magnet 9 to ground. This lifts contact bar B in block B$^3$, thereby closing switch point 9$^a$, which forms part of the car operating circuit from feed wire F to trolley wire W. The complete closing of the car operating circuit is accomplished by energizing magnet 90 in block B$^3$ by a circuit (starting from block B$^2$) closed through wires 1, 51, switch points 90$^g$, wire 54, switch points 22$^b$, wires 12, 13, 11, switch points 5$^b$, wire 53, and through magnet 90 to ground. Magnet 90 cannot be energized, however, unless block B$^2$ is dead, for if a car was in block B$^2$ contact bar A in said block would be at the left, thereby opening said circuit at switch points 22$^b$. The energizing of magnet 90 in block B$^3$ lifts contact bar C, and both contact bars B and C now being lifted, a circuit is closed in block B$^3$ sufficient to operate the car through wire 1, switch points 9$^a$, wire 3, switch points 90$^a$, wire 4, trolley wire W, trolley T, and through the car to ground.

Perfect protection thus is afforded. A car in block B$^4$ cannot proceed while a car is in block B$^3$, as the car operating circuit in block B$^4$ cannot be closed, and the car in block B$^3$ cannot proceed while the car is in block B$^2$, as the car operating circuit in block B$^3$ cannot be closed. In other words, the car operating circuit in each block is closed through a circuit closed by switch points 9$^a$ and 90$^a$, these switch points cannot be closed unless magnets 9 and 90 are energized, magnet 9 cannot be energized unless the block behind is dead, and magnet 90 cannot be energized unless the block ahead is dead.

When the car is in block B$^3$, the signals (L$^3$ at night or if foggy, or S$^3$ by day, or both if desired) in that block and the signals (L$^4$ or S$^4$ or both) in the block behind are maintained at danger by gravity in the manner described hereinafter.

If a car approaching block B$^4$ should disregard the danger signal and pass into the block, it would be unable to proceed, as the circuit through magnet 22 from block B$^3$ carries a larger current than said car would cause to pass through magnet 5 by closing the circuit therethrough, and the car would stop itself and not the car in block B$^3$. Should magnet 22 in block B$^4$ be out of order so that the circuit closed by a car in said block through magnet 5 caused said magnet to pull contact bar A to the left, both cars would be unable to proceed. The car operating circuit in block B$^4$ would remain open at 90$^a$ and the car operating circuit in block B$^3$ would be opened at 9$^a$.

The apparatus is designed to afford protection if the line wires are broken, grounded or crossed. It has been shown above in detail, that when a car enters a block, as block B$^3$, magnet 5 in that block is energized and contact bar A pulled to the left. This closes a circuit through line wire 29—20 to energize magnet 22 in the block behind (block B⁴) which pulls contact bar A in said block to the right. This closes switch point 22ᶜ (block B⁴) in a circuit through line wires 13—12 to magnet 9 (block B³), which closes one of the switch points (9ᵃ) in the car operating circuit in said block (block B³). The other switch point (90ᵃ) in said car operating circuit (block B³) is closed by energizing magnet 90 (block B³) by a circuit from the block ahead (block B²) through line wires 12—13. It thus is evident that if either line wires 20—29 or 12—13 are broken or grounded, or if they are crossed, the cars cannot proceed and are protected.

If, for example, line wire 20—29 is broken and a car enters an unoccupied block, magnet 22 in the block behind cannot be energized owing to the broken line wire, and the car cannot proceed. Neither can a car entering the block behind proceed as the presence of a car in the block ahead has caused contact bar A in said block ahead to be pulled to the left, and switch point 90ᵃ in the car operating circuit of said block behind cannot be closed. If a car already is proceeding in a block, as block B³, (in which case block B² must be unoccupied) and a car enters block B⁴, both cars will be stopped, as owing to the broken line wire, the presence of a car in block B⁴ will pull contact bar 5 in said block B⁴ to the left. This opens the circuit to magnet 9 (block B³) thereby opening switch points 9ᵃ (block B³) in the car operating circuit of said block. Switch point 90ᵃ (block B⁴) in the car operating circuit of said block B⁴ cannot be closed, owing to the presence of a car in block B³, as the contact bar A in said block B³ would be at the left. If line wire 20—29 grounds, the result will be the same, as magnet 22 in the block behind cannot be energized. If the ground is complete, fuse 14 in the block ahead of magnet 22 will be blown.

If line wire 12—13 is broken, and a car enters an unoccupied block, magnet 9 in said block cannot be energized from the block behind, owing to said broken line wire; and magnet 90 cannot be energized from the block ahead, owing to said broken line wire; either of which prevents the car from proceeding. Neither can a car entering the block behind proceed, as switch point 90ᵃ in the car operating circuit of the block behind cannot be closed. If a car already is proceeding in a block, as block B³, (in which case block B² must be unoccupied), and a car enters the block behind (block B⁴), both cars will be stopped, as owing to broken line wires 12—13, the car operating circuit (block B³) will be opened at switch points 9ᵃ and 90ᵃ, and switch point 90ᵃ (block B⁴) cannot be closed in the car operating circuit (block B⁴). If line wire 12—13 grounds, the result will be the same, as magnets 9 and 90 cannot be energized. If the ground is complete, the fuse in wire 51 will be blown.

If line wires 12—13 and 20—29 cross, and a car enters an unoccupied block, magnet 22 will be so strongly energized by the current fed from line wire 12—13 to line wire 20—29, that it will not be possible for magnet 5 to pull contact bar A to the left. This cross also causes the signal to go to danger. If the block is occupied, not enough current will be fed to magnet 22 to cause it to pull over contact bar A, as, for example, it requires half an ampere and the amount fed from this cross under these conditions would be from one sixteenth to one eighth of an ampere, according to the arrangement of the resistance, and contact bar A could not be pulled to the right electrically.

The signals are operated by a circuit closed through switch points 28ⁱ and 28ᵍ by contact bar D which is controlled by magnet 28 and by gravity. The signal L¹ or S¹ or both is set at clear (block B') by a circuit closed through wires 1, 40, switch point 28ᵃ, wire 41, and through the signal to ground. The signal L³ or S³, or both, is set at danger (block B³) by a circuit closed through wires 1, 40, 42, switch point 28ᵍ, wire 43, and through the signal to ground. That is, when magnet 28 is energized, the signal is set at clear, and when magnet 28 is deënergized, the signal is set at danger. The circuit for energizing magnet 28 is closed (blocks B¹ and B²) by a circuit through wire 1, fuse 14, wires 15, 25, switch points 22ᵃ, wire 26, magnet 28, wire 59, where it splits, one half going to ground through wire 23, switch points 30ᵍ, and through resistance 24 to ground, and the other half going through wires 20, 29, contact bar H, and through resistance 31 to ground. Magnet 28 is deënergized when the block which contains it, or a block ahead, is occupied by a car. When the same block is occupied by a car, the circuit is broken at switch points 22ᵃ, and when the block ahead is occupied by a car, the magnet is deënergized by reason of the fact that magnet 22 is of much lower resistance than magnet 28 and is in parallel with magnet 28 on the same resistance.

In order that a car may proceed in case any accident or derangement occurs, emergency operation is provided for in accordance with fixed traffic rules. Under these rules, after waiting the prescribed time for current, the motorman opens the door of the signal box, thereby breaking a seal, for which he is required to render a report. Three handles of any type or construction are provided in the box, which are positively interlocked in any desired manner, to insure their operation in the following order: The operation of the first handle 99 throws contact bar A to the left, which should result in placing the parts in the same position as though operated by the car circuit in the ordinary manner. The next handle indicated at 100 then must be operated, which releases contact bar E in the block behind, if it has been raised by emergency handle 101, in the manner described hereinafter. If the car is still unable to get current, emergency handle 101 is pushed up, which will raise contact bars B and C, thereby closing switch points 9ª and 90ª of the car operating circuit. Handle 101 will be maintained in position by the energizing of magnet 30 by a circuit through wire 1, fuse 14, wires 15, 16, magnet 30, wire 37, switch points 30ª, wires 38, 20, 29, contact bar H, and through resistance 31 to ground. The car is protected in the rear owing to the position of contact bar A in this block, and can proceed under caution. Upon reaching the block ahead, release handle 100 must be operated, which will open the circuit energizing magnet 30, and contact bar E of the block to the rear of said block will return to normal position, as emergency handle 101 is so interlocked with emergency handle 100 in the manner stated above that handle 100 must be raised before handle 101 can be raised. The car will not be able to proceed until the block behind thus has been returned to normal condition. If the line wires are down, emergency handle 101 will not stay up because the circuit to magnet 30 is completed along line wire 20—29, in which case a maintainer (or repairman) can open an inner box, and after pushing up release handle 101, fasten it in position by the small mechanical lock 102, so that the cars can operate until the trouble is remedied. Under this last condition, it will be necessary to operate the block behind by emergency handle 101 and release it by handle 100 when the block is reached in which emergency handle 101 is held up mechanically. By the use of this emergency handle cars never can be tied up by lack of power, but can be sent ahead under proper protection, it being necessary only that a man get off at each signal box until the trouble has been remedied.

Many other embodiments of my invention will be apparent to those skilled in the art, without departing from the scope thereof or from the scope of my claims.

What I claim is:

1. In a block system for electric railways, a feed wire, a contactor divided into insulated sections, connections between said feed wire and said insulated sections normally interrupting the flow of motor operating current, and electrical means to prevent motor-operating current flowing from said feed wire to an occupied section until the section ahead of said occupied section first has been deënergized.

2. In a block system for electric railways, a feed wire, a contactor divided into insulated sections, connections between said feed wire and said insulated sections, means normally preventing motor-operating current flowing from said feed wire to an occupied section, and means for permitting such flow normally operable only when the section ahead of said occupied section has been deënergized.

3. In a block system for electric railways, a feed wire, a contactor divided into insulated sections, connections between said feed wire and said insulated sections comprising line wires, and means to prevent motor-operating current flowing from said feed wire to an occupied section when any of said line wires is broken.

4. In a block system for electric railways, a feed wire, a contactor divided into insulated sections, connections between said feed wire and said insulated sections comprising line wires, and means to prevent motor-operating current flowing from said feed wire to an occupied section when any of said line wires is grounded.

5. In a block system for electric railways, a feed wire, a contactor divided into insulated sections, connections between said feed wire and said insulated sections comprising line wires, and means to prevent motor-operating current flowing from said feed wire to an occupied section when any of said line wires are crossed.

6. In a block system for electric railways, a feed wire, a contactor divided into insulated sections, connections between said feed wire and said insulated sections, electrical means to permit current to flow from said feed wire to an occupied section when the section behind first has been deënergized and means to deënergize said section, and means to prevent current flowing from said feed wire to both said sections if the means to deënergize the section behind said occupied section becomes deranged and a car enters said unoccupied section.

7. In a block system for electric railways, a feed wire, a contactor divided into insulated sections, connections between said feed wire and said insulated sections, resistance means in said connections normally preventing sufficient current flowing from said feed wire to a section to operate a car but permitting sufficient current to flow to operate means to prevent full motor-operating current flowing from said feed wire to the section behind the first-named section.

8. In a block system for electric railways, a feed wire, a contactor divided into insulated sections, connections between said feed wire and said insulated sections, resistance means in said connections normally preventing sufficient current to operate a car flowing from said feed wire to a section, but permitting sufficient current to flow to operate means to prevent full motor-operating current flowing from said feed wire to the section ahead of the first named section.

9. In a block system for electric railways, a feed wire, a contactor divided into insulated sections, connections between said feed wire and said insulated sections, resistance means in said connections normally preventing sufficient current to operate a car flowing from said feed wire to a section but permitting sufficient current to flow to operate means to prevent full motor-operating current flowing from said feed wire to the section behind and the section ahead of the first named section.

10. In a block system for electric railways, a feed wire, a contactor divided into insulated sections, connections comprising wires between said feed wire and said insulated sections, means to prevent motor-operating current flowing from said feed wire to an occupied section until the section behind and the section ahead of said occupied section have been deënergized, and means to permit full motor current to flow through said feed wire to an occupied section when said section ahead and said section behind are deënergized without any resistance to said flow other than its own wires.

11. In a block system for electric railways, a feed wire, a contactor divided into insulated sections, connections between said feed wire and said insulated sections, electrical means to prevent motor-operating current flowing from said feed wire to an occupied section, means to deënergize the section ahead of said occupied section, means to enable said occupied section to obtain motor-operating current from said feed wire by the operation of the two means previously named, and manually-operated means in addition to said previous means to energize said section in case said previous means fail to operate.

12. In a block system for electric railways, a feed wire, a contactor divided into insulated sections, connections between said feed wire and said insulated sections, and electrical means to prevent motor-operating current flowing from said feed wire to an occupied section, means to deënergize the section ahead of said occupied section, and means to enable said occupied section to obtain motor-operating current from said feed wire by the operation of the two means previously named comprising two switches, means to close one of said switches when the section behind has been deënergized and means to close the other of said switches when said section ahead has been deënergized, wherby full motor-operating current will flow from said feed wire to said occupied section.

13. In a block signal system, a series of blocks each having a feeding lead, and electromagnetic switches normally interrupting circuit through said lead, and means whereby the closing of said switches in one block will effect the opening of the operating circuit of a switch in each of the adjacent blocks.

14. In a block signal system, a block having a feeding lead normally broken at a plurality of points, means responsive to the unoccupied condition of the adjacent rear block for closing one of said breaks, and means responsive to the unoccupied condition of the adjacent forward block for closing another of said breaks.

15. In a block signal system, a plurality of insulated sections each having a feeding lead and an electromagnetic switch normally breaking circuit through said lead, and means whereby the movement of a switch in one block to closed position functions to effect a break in the operating circuit of the switch of an adjacent block.

16. In a block system for electric railways, a series of blocks each having a feeding lead and a circuit interrupter normally breaking circuit therethrough, operating circuits for each interrupter having a break adapted to be bridged by the circuit interrupter of an adjacent block when the latter interrupter is in open position.

17. In a block signaling system, a series of blocks each having a main feeder, a relay normally interrupting the feeder circuit and a contact bar movable to make and break the relay circuit, means for moving the contact bar to close the break in the relay circuit of a block and for moving the contact bar of an adjacent block to break its corresponding relay circuit, upon the entrance of a car into said first-mentioned block.

18. In a block signaling system, a series of blocks each having a feeding lead with an electromagnetic circuit interrupter interposed therein, and a circuit maker and breaker included in each block movable to energize the circuit interrupter of the corresponding block and to deënergize the circuit interrupter of an adjacent block.

19. In a block signaling system, a series of blocks each having a feeding lead with an electromagnetic circuit interrupter interposed therein, and a circuit maker and breaker included in each block movable to energize the circuit interrupter of the corresponding block and to deënergize a circuit interrupter in both adjacent blocks.

20. In a block signaling system, a block having a feeding lead with a circuit interrupter interposed therein, automatic means for closing said interrupter upon the occupation of the block by a car, manual means to perform the same function, and a device interlocked with said manual means whereby the preceding block must be deënergized before the interrupter can be manually moved to closed position.

21. In a block signaling system, a block having a feeding lead with a circuit interrupter interposed therein, automatic means for closing said interrupter upon the occupation of the block by a car, manual means to perform the same function, and a device interlocked with said manual means whereby the preceding and succeeding block must be deënergized before the interrupter can be manually moved to closed position.

22. In a block signaling system, a block having a feeding lead with a circuit interrupter interposed therein, and manual means for closing said circuit interrupter operable only when an adjacent block is deënergized.

23. In a block signaling system, a block having a feeding lead with a circuit interrupter interposed therein, and manual means for closing said circuit interrupter operable only when both adjacent blocks are deënergized.

24. In a block signaling system, automatic means to energize a block when occupied by a car and to deënergize an adjacent block and supplementary manual operating devices adapted to perfom the same operations in case said automatic means should fail to operate.

25. In combination, an automatic block signaling system, and supplementary manually operable actuating devices for said system adapted to be moved to perform the same operations as their corresponding automatic elements.

26. In combination, an automatic block signaling system, and supplementary manually operable actuating devices for said system so interlocked as to necessitate their operation in the order of the operation of the corresponding automatic elements.

In testimony that I claim the foregoing I have hereunto set my hand.

ROY V. COLLINS.

Witnesses:
L. BRODERICK,
V. G. LLOYD.

Copies of this patent may be obtained for five cents each, by addressing the "Commissioner of Patents, Washington, D. C."